July 29, 1941.                M. GEIGER                2,250,706
                        SAW TOOTH WAVE GENERATOR
                           Filed Sept. 29, 1938
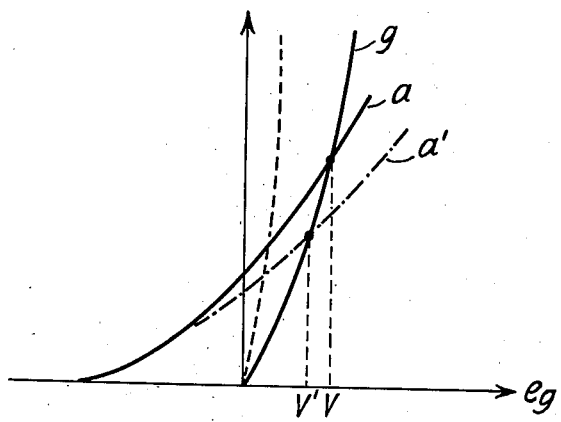
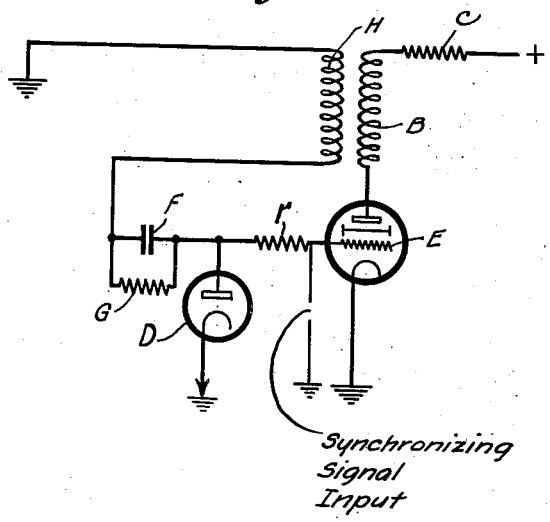
INVENTOR
MAX GEIGER
BY
H. S. Snover
ATTORNEY Patented July 29, 1941

2,250,706

UNITED STATES PATENT OFFICE 2,250,706

SAW-TOOTH WAVE GENERATOR

Max Geiger, Berlin, Germany, assignor to Telefunken Gesellschaft für Drahtlose Telegraphie m. b. H., Berlin, Germany, a corporation of Germany Application September 29, 1938, Serial No. 232,271
In Germany March 19, 1937

2 Claims. (Cl. 250—36)

Ratchet-wave or time-base generators are known in the prior art comprising a tickler-coil or inductive feedback between the plate and the grid circuit, and in which the grid circuit contains a resistance-grid mesh. This type of ratchet-wave generators are also known as self locking oscillators, and they operate essentially in such a way that by virtue of the feedback the grid potential is raised until grid current starts to flow as soon as a small plate current has commenced to flow, the interruption or cut-off of the plate current flow being a function of the oscillation process in the plate circuit.

Now, the invention is concerned with the problem of making the length or duration of the current impulses supplied by such a blocking oscillator independent of the amplitude of the plate or of the screen-grid potential of the tube. For the reasons to be set forth further below in more detail, the length of the plate-current impulses proves inadequately constant whenever the requirements in practice are severe, as is true, for instance, of television work. For a better understanding of the invention it is necessary to take into consideration the following three time periods or intervals comprised in the duration of the plate-current impulses of the blocking oscillator.

I. As soon as the potential across the resistance-condenser mesh in the grid circuit has proceeded to a point where, optionally, by the boost (co-action) of a synchronizing impulse supplied from the outside to the blocking oscillator, a certain plate current is initiated, the control-grid potential by virtue of the feedback rapidly shifts in the positive sense until there is incipient grid current flow.

II. By this grid current the condenser included in the grid circuit becomes charged, and this lasts as long as the current in the primary winding of the tickler transformer experience a rise.

III. Now, as soon as the current in the primary winding has exceeded its crest value, the voltage across the secondary winding is reversed, and the grid potential as a consequence is caused to change in the negative direction. The result is that the grid current and a short instant thereafter also the plate current are broken off again, and the charge on the condenser of the grid circuit represents a high negative biasing potential which, because of the high time-constant represented by the resistance-capacity mesh will be able to leak away only inside a comparatively long period of time to such an extent that, either with or without the boost of the next synchronizing impulse, flow of a new plate current is able to recur.

Now, in a blocking oscillator of this type, fluctuations in the length of the plate-current impulse are liable to happen for the reason that the plate current-grid voltage characteristic of the tube that happens to be used is a function of the value of the plate or screen-grid potential; in fact, the said characteristic will occupy changing positions as a result of a slow drift of the D. C. voltage or of the ageing of the tubes, and because a certain relation exists between the secondary current (that is, the grid current) and the primary current (i. e., the plate current) by virtue of the link introduced by the transformer between secondary and primary currents. If the proportionality factor of this relation is assumed to be unity, then, referring to Fig. 1 (where the plate current-grid voltage characteristic is denoted by $a$ and for another auxiliary voltage value or another tube age denoted by $a'$), it is feasible to ascertain the point of intersection of the grid current-grid voltage characteristic $g$ with $a$ or $a'$ respectively, and this results in the value of the grid voltage to which the grid voltage must still rise, even after incipient grid current flow. However, the value of the grid potential will be either $V$ or $V'$ according to the position of $a$ and $a'$ and the particular point of intersection so found. The result is that because of this difference of the grid voltage values, an interval of time of different length will elapse after the voltage reversal across the secondary winding for dissimilar positions $a$ and $a'$, before the grid current is cut-off again. And this means nothing else but that the length or duration of the plate-current pulses is a function of the plate or screen-grid voltage value.

Now, according to the invention a diode is inserted in parallel relation to the grid-cathode path, with the consequence that the condenser included in the grid circuit is exclusively or principally charged up by the plate current of the diode. Hence, the plate-current characteristic $d$ of the diode plays now the part of the grid-current/grid-voltage characteristic $g$, Fig. 1. This characteristic intersects with the characteristics $a$ and $a'$ in points to which correspond nearly the same grid voltage so that the length of the plate-current impulse here becomes independent of the anode (or screen-grid) potential and of the age of the tube.

Referring to Fig. 2 there is shown an embodiment of my invention. Connected serially to the anode of the tube is an inductive member B, and serially connected with the inductive member B is a resistance member C. The terminal of the resistance member C remote from the terminal thereof connected to the inductive member B is connected to the positive terminal of the anode energizing source indicated herein as +. The negative side of the source is grounded in the normal fashion.

Connected serially with the control electrode E of the thermionic tube A is a resistance $r$ and the terminal of this resistance remote from the terminal thereof connected to the control electrode E is connected to the anode of a diode D. The cathode of the diode is grounded in the normal fashion. Also connected to the anode of the diode D is a time constant circuit comprising a condenser F, with a leakage path in the form of a resistance G shunted there across and connected serially with the time constant circuit is an inductive member H, the terminal thereof remote from that connected to the time constant circuit being grounded. The inductive member H is coupled to the inductive member B.

What I claim is:

1. In a relaxation oscillation generator a thermionic tube having anode, cathode and at least one control electrode, a time constant circuit comprising the parallel combination of resistance means and condenser means connected serially with the control electrode and in the control electrode-cathode circuit of said tube, means for feeding back a portion of the energy of the anode-cathode circuit to said control electrode-cathode circuit, and diode means comprising an anode and a cathode connected so as to charge the condenser means in said time constant circuit during anode current flow in said tube, said diode being connected substantially in parallel with the control electrode-cathode space discharge path of said thermionic tube and having its anode connected between said control electrode and said time constant circuit.

2. Apparatus in accordance with claim 1, wherein said means for feeding back a portion of the energy in the anode-cathode path of the thermionic tube to the control electrode-cathode path of the thermionic tube comprises a first inductive member connected in the anode-cathode path of said tube and a second inductive member connected serially with said control electrode in the control electrode-cathode path of said tube and coupled to said first inductive member.

MAX GEIGER.